(12) United States Patent
Saito et al.

(10) Patent No.: US 8,352,096 B2
(45) Date of Patent: Jan. 8, 2013

(54) SEMICONDUCTOR DATA PROCESSING DEVICE AND DATA PROCESSING SYSTEM

(75) Inventors: Seiichi Saito, Tokyo (JP); Katsuo Kanemaru, Tokyo (JP); Takahiro Oga, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 443 days.

(21) Appl. No.: 12/763,283

(22) Filed: Apr. 20, 2010

(65) Prior Publication Data

US 2010/0274412 A1     Oct. 28, 2010

(30) Foreign Application Priority Data

Apr. 23, 2009   (JP) .................................. 2009-105406

(51) Int. Cl.
*G05D 1/00* (2006.01)
*G06F 17/00* (2006.01)
*G06F 9/00* (2006.01)
(52) U.S. Cl. .................................. 701/1; 700/94; 713/1
(58) Field of Classification Search ........................ None
See application file for complete search history.

(56) References Cited

U.S. PATENT DOCUMENTS

2008/0086729 A1     4/2008   Kondoh et al.
2008/0288687 A1     11/2008  Kondoh

FOREIGN PATENT DOCUMENTS

JP       2004-334410 A     11/2004
JP       2008-97173 A      4/2008

*Primary Examiner* — Thomas Tarcza
*Assistant Examiner* — Adam Alharbi
(74) *Attorney, Agent, or Firm* — Miles & Stockbridge P.C.

(57) ABSTRACT

The present invention provides an arrangement for enabling a plurality of central processing units to share specific resources while ensuring overall reliability owing to domain separation. More specifically, in a semiconductor data processing device comprising a plurality of access management circuits for managing access to resource units that are sharable by the central processing units via an internal bus, each of the access management circuits performs permission/inhibition control for access from the central processing units to the resource units according to a setting state of a domain setup register so as to allow domain separation of the resource units for each of the central processing units, and through use of a priority access permission control function for specific resource units selectively recognized by the access management circuits as resources sharable by the central processing units, access from one of the central processing units that is identified by register setting data is given higher priority than access from the other central processing units.

16 Claims, 11 Drawing Sheets

FIG. 2

(RESOURCE ALLOCATION FOR EACH DOMAIN)

|  | CONTROL SYSTEM DOMAIN CPU#0 | INFORMATION SYSTEM DOMAIN CPU#1 |
|---|---|---|
| CPU#0 | ○ | — |
| CPU#1 | — | ○ |
| DISPLAY CONTROLLER | ○ | ○ |
| AUDIO CONTROLLER | ○ | ○ |
| SCI#0 | ○ | — |
| SCI#1 | — | ○ |
| TMR#0 | ○ | — |
| TMR#1 | — | ○ |
| SDRAM | ○ | ○ |
| DMAC#0 | ○ | — |
| DMAC#1 | — | ○ |
| VIN#0 | ○ | — |
| VIN#1 | — | ○ |
| IMAGE RECOGNITION PROCESSING CIRCUIT | ○ | — |

FIG. 3

| ACCESS CONTROL | | | | RESOURCE ADDRESS | |
|---|---|---|---|---|---|
| CPU#0 | CPU#1 | DMAC#0 | DMAC#1 | | |
| PERMITTED | BLOCKED | PERMITTED | BLOCKED | 00000h-3FFFFh | DDRSDRAM |
| BLOCKED | PERMITTED | BLOCKED | PERMITTED | 40000h-7FFFFh | |
| BLOCKED | PERMITTED | PERMITTED | BLOCKED | F0000h-F07FFh | DISPLAY CONTROLLER REGISTER SET |
| PERMITTED | BLOCKED | BLOCKED | BLOCKED | F0800h-F0FFFh | DISPLAY CONTROLLER REGISTER SET |
|  |  |  |  |  | CPU#0 PRIORITY CONTROL REGISTER |
| BLOCKED | PERMITTED | BLOCKED | PERMITTED | F1000h-F17FFh | AUDIO CONTROLLER REGISTER SET |
| PERMITTED | BLOCKED | PERMITTED | BLOCKED | F1800h-F1FFFh | AUDIO CONTROLLER REGISTER SET |
|  |  |  |  |  | CPU#1 PRIORITY CONTROL REGISTER |
| PERMITTED | BLOCKED | PERMITTED | BLOCKED | F2000h-F2FFFh | SCI#0 REGISTER SET |
| BLOCKED | PERMITTED | BLOCKED | PERMITTED | F3000h-F3FFFh | SCI#1 REGISTER SET |
| PERMITTED | BLOCKED | BLOCKED | BLOCKED | F4000h-F4FFFh | TMR#0 REGISTER SET |
| BLOCKED | PERMITTED | BLOCKED | BLOCKED | F5000h-F5FFFh | TMR#1 REGISTER SET |
| PERMITTED | BLOCKED | BLOCKED | BLOCKED | F6000h-F6FFFh | DMAC#0 REGISTER SET |
| BLOCKED | PERMITTED | BLOCKED | BLOCKED | F7000h-F7FFFh | DMAC#1 REGISTER SET |
| PERMITTED | BLOCKED | BLOCKED | BLOCKED | F8000h-F8FFFh | VIN#0 REGISTER SET |
| BLOCKED | PERMITTED | BLOCKED | BLOCKED | F9000h-F9FFFh | VIN#1 REGISTER SET |
| PERMITTED | BLOCKED | BLOCKED | BLOCKED | FA000h-FAFFFh | IMAGE RECOGNITION PROCESSING CIRCUIT REGISTER SET |

FIG. 4

(SETTING EXAMPLE 1)

| ADDRESS | REQUESTER FOR ACCESS: CPU#0 | | REQUESTER FOR ACCESS: CPU#1 | |
|---|---|---|---|---|
| | READ | WRITE | READ | WRITE |
| F0000h-F07FFh | PERMITTED | PERMITTED | PERMITTED | PERMITTED |
| F0800h-F0FFFh | PERMITTED | PERMITTED | BLOCKED | BLOCKED |

FIG. 5

(SETTING EXAMPLE 2)

| ADDRESS | REQUESTER FOR ACCESS: CPU#0 | | REQUESTER FOR ACCESS: CPU#1 | |
|---|---|---|---|---|
| | READ | WRITE | READ | WRITE |
| F0000h-F07FFh | PERMITTED | PERMITTED | PERMITTED | PERMITTED |
| F0800h-F0FFFh | PERMITTED | PERMITTED | PERMITTED | BLOCKED |

SEMICONDUCTOR DATA PROCESSING DEVICE AND DATA PROCESSING SYSTEM

CROSS-REFERENCE TO RELATED APPLICATIONS

The disclosure of Japanese Patent Application No. 2009-105406 filed on Apr. 23, 2009 including the specification, drawings and abstract is incorporated herein by reference in its entirety.

BACKGROUND OF THE INVENTION

The present invention relates to a semiconductor data processing device having an arrangement for enabling domain setting of resources for each central processing unit (CPU) included therein, and also relates to a data processing system using the semiconductor data processing device. More particularly, the present invention pertains to a semiconductor data processing device technique that is effectively applicable to such a semiconductor device as a system-on-chip (SOC) microcomputer to be embedded in an automotive electrical/electronic apparatus, for example.

In an SOC microcomputer having dual-core CPUs or the like wherein each of the CPUs is run under control of an operating system (OS) thereof on the basis of asymmetric multiprocessing (AMP), there arises a disadvantage that reliability tends to decrease due to such an adverse condition as resource contention by the CPUs or mutual error-induced influence on the CPUs. A well-known technique for obviating this disadvantage is to set up a domain for each CPU in a fashion that each access area is protected hardware-wise, i.e., to implement so-called "domain separation" applicable for enhancement in reliability.

For example, in Patent Document 1 indicated below, there is disclosed a domain separation technique wherein an illegal address access blocking mechanism is disposed between a bus master device and a bus, and wherein the illegal address access blocking mechanism is arranged to have a register for setting up an access permission address range. In the above arrangement, a comparator judges whether an address output at an address line is within the access permission address range, and then, if the address output at the address line is not within the access permission address range, a control line output is disabled for blocking against an illegal access attempt.

In Patent Document 2 indicated below, there is disclosed another domain separation technique wherein a plurality of virtual machines and virtual machine managers that carry out user programs under control of respectively different operating systems are provided to arrange selective configuration of central processing units according to setting information specified in a mode register, and wherein a resource access management module is provided for managing access to hardware resources sharable by the virtual machines. In the above arrangement, the resource access management module receives the setting information specified in the mode register and access control information regarding access from each central processing unit to a hardware resource, and then the resource access control module compares the information thus received with control register setting information. Thus, permission/inhibition control is performed for access to the hardware resource based on the access control information.

PATENT DOCUMENT 1

Japanese Unexamined Patent Publication No. 2004-334410

PATENT DOCUMENT 2

Japanese Unexamined Patent Publication No. 2008-97173

SUMMARY OF THE INVENTION

In domain separation according to the techniques disclosed in the prior art patent documents mentioned above, at the time of attempting to make access to a resource, each CPU issues identification information thereof such as an identification number, and a resource management module detects the identification information. If an access attempt is made from a CPU not identified as an acceptable unit for the resource, the access attempt is denied or an address conversion is performed to inhibit access to the resource, thus preventing possible occurrence of a malfunction. As in this manner, to ensure reliability in asymmetric multiprocessing operation, it is of critical importance to correctly manage domain separation of resources so that mutual interference in resource access from a plurality of CPUs is prevented hardware-wise.

In reviewing a system based on the above-mentioned domain separation in terms of product concept design, however, there is a case where some resources are not necessarily applicable to domain separation. For example, the present inventors have found that, even in a domain-separation-based system, a significant problem may occur in recognizability or operability if specific resources are not sharable by a plurality of CPUs in relation to component parts depending on human interface (HMI) such as a display unit and a keyboard interface. In an example of a car navigation system employing an asymmetric multiprocessing scheme, domain separation is made between a control system CPU that is engaged in vehicle operation control requiring a high degree of reliability and an information system CPU that is engaged in entertainment or information communication, i.e., a domain separation arrangement is so made as to provide a control system domain and an information system domain. In the above exemplary car navigation system, a display unit thereof presents map information or communication information under management of the information system domain in normal vehicle operating condition. When critical information found in the control system domain must be given to the display unit, it is required for the control system CPU to issue necessary instructions to the information system CPU so that the critical information will be displayed through use of the information system domain. In this situation, if the information system CPU hangs up due to any cause, it becomes impossible to present the critical information on the display unit, resulting in impaired reliability in vehicle operation control or other problematic conditions. Alternatively, if there is provided a modified domain separation arrangement wherein the control system CPU is allowed to change domain separation setting as required on an each-time basis, the intended purpose of domain separation, i.e., enhancement in reliability by means of domain separation may be lost contrarily.

It is therefore an object of the present invention to provide a semiconductor data processing device capable of allowing a plurality of CPUs to share specific resources while ensuring overall reliability owing to domain separation.

It is another object of the present invention is to provide a data processing system configuration mixedly including a first processing system for which a high degree of reliability is required and a second processing system for which a relatively relaxed degree of reliability is required, wherein the first processing system and the second processing system can share specific resources while preventing the first processing system from being restricted by the second processing system so as to ensure overall reliability owing to domain separation.

The above and other objects, features and advantages of the present invention will become more apparent from the following detailed description with reference to the accompanying drawings.

The representative aspects of the present invention are briefed below:

In carrying out the present invention and according to one aspect thereof, there is provided a semiconductor data processing device comprising a plurality of access management circuits for managing access to resource units that are sharable by a plurality of central processing units via an internal bus, wherein each of the access management circuits performs permission/inhibition control for access from the control processing units to the resource units according to a setting state of a domain setup register so as to allow domain separation of the resource units for each of the central processing units, and wherein, through use of a priority access permission control function for specific resource units selectively recognized by the access management circuits as resources sharable by the central processing units, access from one of the central processing units that is identified by register setting data is given higher priority than access from the other central processing units.

Thus, it is allowed to select a central processing unit acting as a requester for access to the specific resource units according to register setting that is independent of domain separation specified in basic setting. The range of selection in the register setting is limited to the inclusion of central processing units that are privileged to have sharable resource access according to domain separation setting specified by the access management circuit concerned. Hence, it is possible to let a plurality of central processing units share the specific resources while ensuring overall reliability owing to domain separation in the semiconductor data processing device.

The semiconductor data processing device mentioned above is applicable to a data processing system configuration mixedly including a first processing system for which a high degree of reliability is required and a second processing system for which a relaxed degree of reliability is required. In this system configuration, different central processing units are allocated to the first processing system and the second processing system, and domain separation setting is so made as to use a specific resource unit, e.g., a display controller, as a resource sharable by the different central processing units allocated to the first and second processing systems. In the arrangement thus formed, priority control register setting of the specific resource unit is made so that priority will be given to access from the central processing unit of the first processing system only in case of necessity such as an emergency. Thus, even under the condition that the specific resource unit is shared by the first and second processing systems, it is possible to prevent the first processing system from being restricted by the second processing system while ensuring overall reliability owing to domain separation.

Summarized below are advantageous effects to be provided according to the representative aspects of the present invention:

In a semiconductor data processing device according to the present invention, a plurality of central processing units can share specific resources while ensuring overall reliability owing to domain separation.

In a data processing system according to the present invention that has a configuration mixedly including a first processing system for which a high degree of reliability is required and a second processing system for which a relatively relaxed degree of reliability is required, even under the condition that specific resources are shared by the first and second processing systems, it is possible to prevent the first processing system from being restricted by the second processing system while ensuring overall reliability owing to domain separation.

BRIEF DESCRIPTION OF THE DRAWINGS

FIG. 2 is an explanatory diagram showing exemplary resource allocation setting for each domain;

FIG. 3 is an explanatory diagram showing exemplary address mapping in a microcomputer;

FIG. 4 is an explanatory diagram showing a setting example in which a "Permitted" or "Blocked" state can be specified for each of read access and write access in domain allocation;

FIG. 5 is an explanatory diagram showing another setting example in which a "Permitted" or "Blocked" state can be specified for each of read access and write access in domain allocation;

DETAILED DESCRIPTION OF THE PREFERRED EMBODIMENTS

1. Overviews of the Preferred Embodiments

Figure 1:
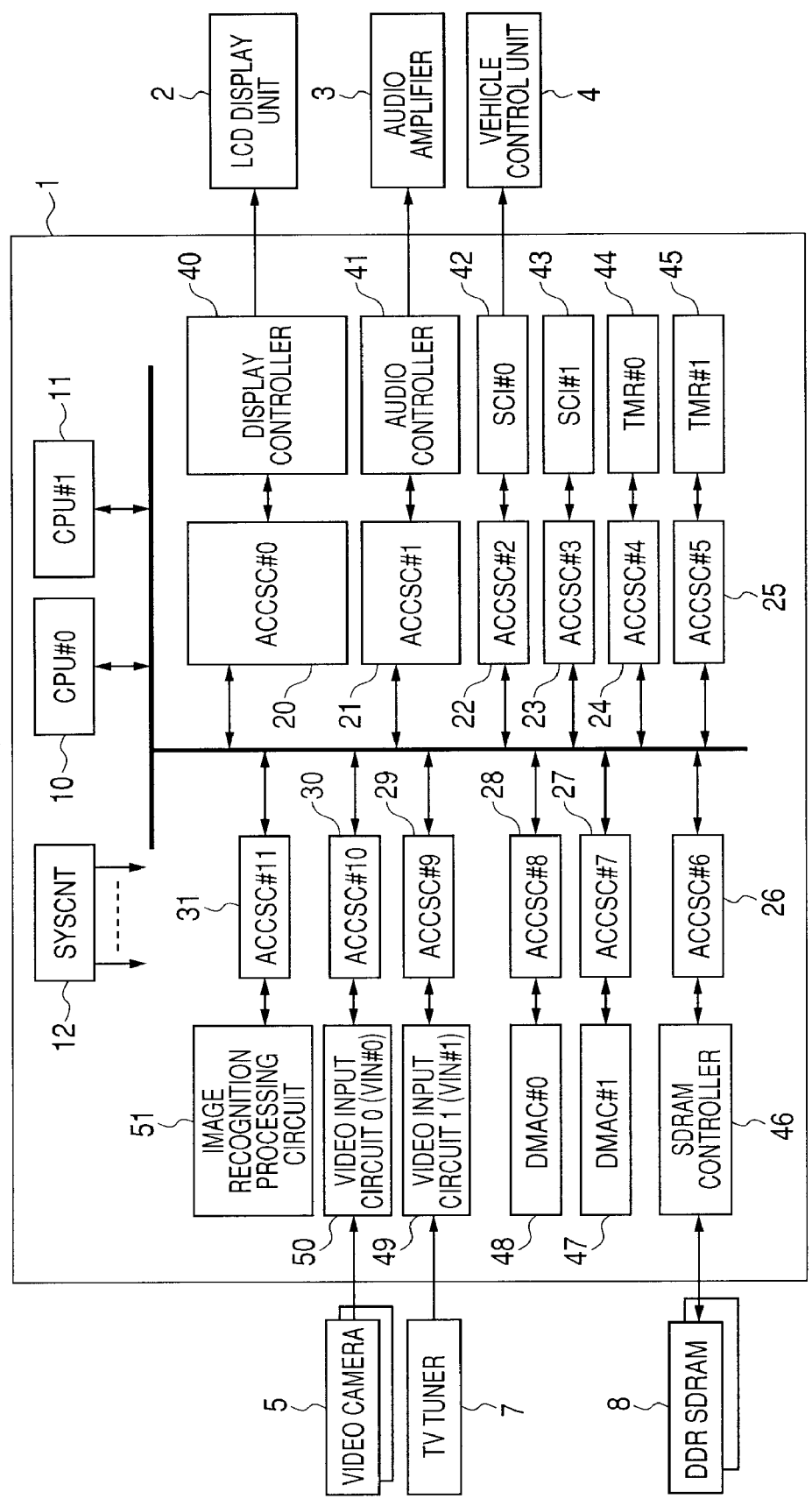
FIG. 1 is a block diagram showing a car navigation system configured as an example of a data processing system according to the present invention.

First, the present invention will be described below regarding the overviews of representative preferred embodiments thereof. It is to be noted that, in the following description of the overviews of the representative preferred embodiments, parenthesized reference numerals are used for illustrative purposes only and designate respective parts that are included in the concepts of corresponding component elements identified by reference numerals in the accompanying drawings.

[1] A semiconductor data processing device (1) comprises a plurality of central processing units (10, 11), an internal bus (60) for coupling the central processing units, a plurality of resource units (40 to 51) that are sharable by the central processing units via the internal bus, and a plurality of access management circuits (20 to 31) for managing access from the central processing units to the resource units. According to a setting state of a domain setup register (65), each of the access management circuits performs permission/inhibition control for access from the central processing units to the resource units. Among the resource units stated above, specific resource units (40, 41) selectively recognized by the access management circuits as sharable resources to be accessed from the central processing units are provided with a priory control register (100C) for which a write of priority control data is enabled by a predetermined one of the central processing units, and provided with a plurality of control circuits ((80 to 82, 85, 86), (120 to 122, 112)) for performing priority access permission control whereunder access from one of the central processing units that is identified by priority control data written in the priority control register is given higher priority than access from the other central processing units.

In the above-mentioned arrangement, it is allowed to select a central processing unit acting as a requester for access to the specific resource units according to register setting that is independent of domain separation specified in basic setting. The range of selection in the register setting is limited to the inclusion of central processing units that are privileged to have sharable resource access according to domain separation setting specified by the domain setup register of the access management circuit concerned. Hence, it is possible to let a plurality of central processing units share the specific resources while ensuring overall reliability owing to domain separation in the semiconductor data processing device.

[2] In the semiconductor data processing device according to item 1, initial setting of the priority control register is made by the predetermined central processing unit.

For maintaining reliability owing to domain separation, it is advantageous to limit such a setting operation as stated above to a particular central processing unit used for controlling higher-priority processing.

[3] In the semiconductor data processing device according to item 2, each of the central processing units is arranged to use the resource units under management of each operating system inherent therein.

Thus, it can be facilitated to achieve enhancement in the efficiency of data processing by including a plurality of central processing units in a single semiconductor data processing device.

[4] In the semiconductor data processing device according to item 3, the predetermined central processing unit is activated at power-on (S1), and then the predetermined central processing unit performs initial setting of the domain setup register (S2). Thereafter, the predetermined central processing unit starts up an operating system thereof (S3). Simultaneously, the predetermined central unit activates the other central processing units (S4). Upon activated by the predetermined central processing unit, each of the other processing units starts up an operating system thereof (S5).

Execution of an orderly startup sequence such as mentioned above in the semiconductor data processing device itself can prevent possible occurrence of an undesirably changed condition in domain separation processing due to an adverse effect of the other central processing units or operating systems thereof.

[5] In the semiconductor data processing device according to item 1, each specific resource unit (40) selectively recognized as a sharable resource comprises a register set (100) used for processing execution thereof. The control circuits include a plurality of address decoders (80, 81) for mapping the register set to each of different address area groups for each central processing unit that is privileged to have sharable resource access by the access management circuit, a decoder output selection circuit (82) for enabling an output signal of one of the address decoders corresponding to the central processing unit identified by priority control data through selection among decoded signals of the respective address decoders, and a plurality of register access control circuits (85, 86) for conducting access control for each register of the register set according to the output signal enabled by the decoder output selection circuit.

Thus, for a plurality of central processing units privileged to have sharable resource access, the physical circuitry of the register set can be configured in a structure having commonality, thereby contributing to reduction in circuit size. It is to be noted that an access error will occur if it is attempted to make access to the register set from a central processing unit having no priority access permission granted by the control circuit even under the condition that access is not blocked in domain separation setting by the access management circuit.

[6] In the semiconductor data processing device according to item 5, when priority control data of the priority control register is changed, the predetermined central processing unit saves information held by the register set into memory. Then, when the priority control data of the priority control register is restored under the condition that the information of the register set is saved in the memory, the predetermined central processing unit restores the information saved in the memory to the register set.

Even if an access error occurs in such a case as mentioned above, register information is thus saved and restored so that the previous display control operation can be resumed readily.

[7] In the semiconductor data processing device according to item 1, the number of specific resource units selectively recognized as sharable resources is equal to the number of central processing units that are privileged to have sharable resource access by the access management circuit, and a plurality of register sets (100A, 100B) are provided for processing operation of the resource units. The control circuits include a plurality of address decoders (120) for mapping the register sets to different address area groups for each central processing unit that is privileged to have sharable resource access by the access management circuit, a plurality of register access control circuits (121, 122) for conducting access control for each register of the register sets according to a decoded signal from the address decoder, and a register selector circuit (112) for coupling between a processing circuit and a register set identified by priority control data through selection among the register sets.

Thus, although the above arrangement does not contribute to reduction in circuit size unlike the arrangement of item 5 in which the physical circuitry of the register set can be configured in a structure having commonality for reduction in circuit size, no error will occur even if it is attempted to make access to the register set from a central processing unit having no priority access permission granted by the control circuit under the condition that access is not blocked in domain separation setting by the access management circuit.

[8] In the semiconductor data processing device according to item 7, when priority control data of the priority control register is changed, the predetermined central processing unit saves information held by the register set into the memory. When the priority control data of the priority control register is restored under the condition that the information of the register set is saved in the memory, the predetermined central processing unit restores the information saved in the memory to the register set.

Thus, register information is saved and restored so that the previous display control operation can be resumed readily [9] In the semiconductor data processing device according to item 1, there are further provided direct memory access controllers (47, 48), included in the resource units, for performing data transfer control in accordance with initial setting by one of the central processing units.

In domain separation setting by the domain setup register, it is required that the central processing unit acting to make initial setting and the direct memory access controller to be subjected to initial setting thereby should belong to the same domain.

[10] In the semiconductor data processing device according to item 1, a display controller (40) and an audio controller (41) are provided as specific resource units selectively recognized as resources sharable by the central processing units. As other resource units, there are further provided an image recognition processing circuit (51) and a plurality of external communication interface controllers (42).

[11] A data processing system in accordance with one aspect of the present invention comprises a semiconductor data processing device (1), and a display unit (2) to be controlled for display operation by the semiconductor data processing device. The semiconductor data processing device comprises a plurality of central processing units, an internal bus for coupling the central processing units, a plurality of resource units sharable by the central processing units via the internal bus, and a plurality of access management circuits for managing access from the central processing units to the resource units. According to a setting state of a domain setup register, each of the access management circuits performs permission/inhibition control for access from the central processing units to the resource units. Among the resource units, there is provided a display controller (40) as a specific resource unit that is selectively recognized by the access management circuit as a resource sharable by the central processing units. The display controller is provided with a priority control register for which a write of priority control data is enabled by a predetermined one of the central processing units, and provided with a plurality of control circuits for performing priority access permission control whereunder access from one of the central processing units that is identified by priority control data written in the priority control register is given higher priority than access from the other central processing units.

For example, in a data processing system configuration mixedly including a first processing system such as an equipment control system designed to meet a high degree of reliability requirement and a second processing system such as an information display system designed to meet a relatively relaxed degree of reliability requirement, different central processing units are allocated to the first processing system and the second processing system, and domain separation setting is so made as to use a display controller as a resource sharable by the different central processing units allocated to the first and second processing systems. In the exemplary arrangement mentioned above, priority control register setting of the display controller is made so that priority will be given to access from the central processing unit of the first processing system only in case of necessity such as an emergency. Thus, even under the condition that the display controller is shared by the first and second processing systems, a display presentation indicating an emergency event or the like in the first processing system can be protected from being restricted due to such a non-emergency operation as a normal video picture display operation in the second processing system while ensuring overall reliability owing to domain separation.

[12] In the data processing system according to item 11, there is further provided a video camera (5) for supplying a video signal to the semiconductor data processing device. The semiconductor data processing device further comprises a video signal input circuit (50) for inputting the video signal, and an image recognition processing circuit (51) for carrying out image processing operation for image recognition according to the video signal input through the video signal input circuit. The predetermined central processing unit performs image recognition according to data processed by the image recognition processing circuit, and instructs the display controller to present an alert indication on the display unit according to the result of image recognition.

[13] In the data processing system according to item 12, there is further provided a vehicle control unit (4) for receiving output from the semiconductor data processing device. The semiconductor data processing device further comprises an external communication interface controller (42) for outputting control data to the vehicle control unit. Under direction of the predetermined central processing unit, the display controller outputs alert indication data onto the display unit, and also the external communication interface controller outputs control data to the vehicle control unit as required in the event of alerting.

[14] A data processing system in accordance with another aspect of the present invention comprises a semiconductor data processing device, and an audio amplifier (3) for receiving an audio signal output from the semiconductor data processing device. The semiconductor data processing device comprises a plurality of central processing units, an internal bus for coupling the central processing units, a plurality of resource units sharable by the central processing units via the internal bus, and a plurality of access management circuits for managing access from the central processing units to the resource units. According to a setting state of a domain setup register, each of the access management circuits performs permission/inhibition control for access from the central processing units to the resource units. Among the resource units, there is provided an audio controller (41) for outputting the audio signal as a specific resource unit that is selectively recognized by the access management circuit as a resource sharable by the central processing unit. The audio controller is provided with a priority control register for which a write of priority control data is enabled by a predetermined one of the central processing units, and provided with a plurality of control circuits for performing priority access permission control whereunder access from one of the central processing units that is identified by priority control data written in the priority control register is given higher priority than access from the other central processing units.

For example, in a data processing system configuration mixedly including a first processing system such as an equipment control system designed to meet a high degree of reliability requirement and a second processing system such as an audio system designed to meet a relatively relaxed degree of reliability requirement, different central processing units are allocated to the first processing system and the second processing system, and domain separation setting is so made as to use an audio controller as a resource sharable by the different central processing units allocated to the first and second processing systems. In the exemplary arrangement mentioned above, priority control register setting of the audio controller is made so that priority will be given to access from the central processing unit of the first processing system only in case of necessity such as an emergency. Thus, even under the condition that the audio controller is shared by the first and second processing systems, an audible alert indicating an emergency event or the like in the first processing system can be protected from being restricted due to such a non-emergency operation as a normal audio sound output operation in the second processing system while ensuring overall reliability owing to domain separation.

[15] In the data processing system according to item 14, there is further provided a video camera (5) for supplying a video signal to the semiconductor data processing device. The predetermined central processing unit performs image recognition according to data processed by the image recognition processing circuit, and instructs the audio controller to produce an audible alert from the audio amplifier according to the result of image recognition.

[16] In the data processing system according to item 15, there is further provided a vehicle control unit (4) for receiving output from the semiconductor data processing device. The semiconductor data processing device further comprises an external communication interface controller (42) for outputting control data to the vehicle control unit. Under direction of the predetermined central processing unit, the audio controller outputs audible alert data to the audio amplifier, and also the external communication interface controller outputs control data to the vehicle control unit as required in the event of alerting.

2. Details of the Preferred Embodiments

Referring to FIG. 1, there is shown a block diagram of a car navigation system configured as an example of a data processing system according the present invention. In the car navigation system shown in FIG. 1, a microcomputer (MCU) 1 that is a preferred embodiment of a data processing device according to the present invention is provided with a video camera 5, a television tuner (TV tuner) 7, a DDR SDRAM (Double-Data-Rate Synchronous Dynamic Random Access Memory) 8 or the like, an LCD display unit 2, an audio amplifier 3, and a vehicle control unit 4. The microcomputer 1, though not particularly limited to the following operations, performs image recognition using image data taken through the video camera 5, controls the LCD display unit 2 for displaying a vehicle traveling assistance guide according to the result of image recognition, controls the audio amplifier 3 for audio output, and conducts the vehicle control unit (ECU) 4 for performing electronic control operations such as vehicle engine control and brake assistance control according to the result of image recognition and other data.

The microcomputer 1 comprises two central processing units (CPU#0, CPU#1) 10 and 11 that carry out application programs under control of respectively different operating systems (OS). For example, as resource units for the central processing units (CPU#0, CPU#1) 10 and 11, there are provided a display controller 40, an audio controller 41, serial communication interface controllers (SCI#0, SCI#1) 42 and 43, timers (TMR#0, TMR#1) 44 and 45, an SDRAM controller 46 serving as a memory controller, direct memory access controllers (DMAC#0, DMAC#1) 47 and 48, video input circuits (VIN#0, VIN#1) 49 and 50, and an image recognition processing circuit 51. These resource units 40 to 51 are accessed, for use thereof, from the central processing units (CPU#0, CPU#1) 10 and 11 via an internal bus 60. The central processing units (CPU#0, CPU#1) 10 and 11 may be arranged to have a simple circuit configuration including only basic functions such as instruction fetching, instruction decoding and arithmetic operation functions, or arranged to have a full-fledged circuit configuration such as a so-called CPU core including an SRAM serving as a working memory, a nonvolatile memory containing operating system programs and other basic programs, a floating-point arithmetic unit, an accelerator circuit, and the like in addition to the basic functions. A system controller (SYSCONT) 12 is provided for such purposes as controlling a microcomputer boot-up sequence at power-on and operation modes. Though not particularly limited to the following conditions, the central processing unit (first central processing unit, CPU#0) 10 is used for conducting a vehicle operation control system designed to meet a high degree of reliability requirement, while the central processing unit (second central processing unit, CPU#1) 11 is used for conducting an audio-video operation information system designed to meet a relatively relaxed degree of reliability requirement.

In the microcomputer 1, there are provided access management circuits (ACCSC#0 to ACCSC#11) 20 to 31 for carrying out access management for domain separation of resources to be used by the central processing units 10 and 11. The access management circuits (ACCSC#0 to ACCSC#11) 20 to 31 are arranged in a one-to-one correspondence with the resource units 40 to 51 as shown in FIG. 1. In the present preferred embodiment, two separate resource domains are provided; a control system domain (resource unit group used for control operations of the control system) placed under direction of the central processing unit (CPU#0) 10, and an information system domain (resource unit group used for control operations of the information system) placed under direction of the central processing unit (CPU#1) 11. FIG. 2 shows an example of resource allocation setting for each domain. In FIG. 2, the mark "○" indicates that the resource concerned is allocated to a domain corresponding thereto. In the domain allocation exemplified here, the display controller 40, the audio controller 41, and the SDRAM controller 46 are specified as resources sharable by the central processing units 10 and 11.

FIG. 3 shows an example of address mapping in the microcomputer 1. Domain allocation such as described with reference to FIG. 2 is made using a domain setup register 65 illustrated in FIG. 3. In the example shown in FIG. 3, a code representing a "Permitted" state or a "Blocked" state is set in each of the fields "CPU#0", "CPU#1", "DMAC#0", and "DMAC#1" of the column "Access Control" for domain allocation. The term "Permitted" signifies that a resource in the domain concerned is available to the corresponding central processing unit, and the term "Blocked" signifies that a resource in the domain concerned is not available to the corresponding central processing unit. In a domain of a central processing unit that performs initial setting of the DMAC#0 and DMAC#1 for use thereof, transfer operations are applicable only to resource units available to the central processing unit concerned, i.e., transfer operations are not applicable to resource units unavailable to the central processing unit concerned. The access management circuits 20 to 31 are set only by the central processing unit (CPU#0) 10. On occurrence of an attempt to make access to a "Blocked" resource unit, the relevant one of the access management circuits 20 to 31 nullifies the access attempt and returns an error response to a central processing unit corresponding to the source of access request.

The exemplary addresses assigned to resources in FIG. 3 may be invariable or variable with register setting. In FIG. 3, the term "resource address" signifies a memory address of the memory (DDR SDRAM) 8 for the memory controller 46, or an address of a register set for another circuit. The term "register set" signifies a set of registers allocated in the address space of each central processing unit to carry out operations of a processing circuit of each resource unit. It is to be noted here that resource addresses to be set for sharable resources differ depending on the domain allocation conditions. For example, the resource addresses of the DDR SDRAM 8 are divided into an address area group of 00000h to 3FFFFh and an address area group of 40000h to 7FFFFh. The resource addresses of the display controller 4 are divided into an address area group of F0000h to F07FFh corresponding to a display controller register set 100A and an address area group of F0800h to F0FFFh inclusively corresponding to a display controller register set 100B. The resource addresses of the audio controller 41 are divided into an address area group of F1000h to F17FFh corresponding to an audio controller register set 101A and an address area group of F1800h to F1FFFh inclusively corresponding to an audio controller register set 101B. As will be described in further detail later, for register set mapping to different addresses for respective domains of sharable resources, there may be provided a configuration wherein physically different register sets are mapped to respective address area groups (configuration to be described later with reference to FIG. 10) or a configuration wherein a single physical register set is mapped to a plurality of different address area groups (configuration to be described later with reference to FIG. 8), though not particularly limited thereto. To the other resource units 42 to 45 and 47 to 51, register sets 102 to 110 are assigned respectively in address mapping as shown in FIG. 3.

FIGS. 4 and 5 show different examples of domain allocation. While two states "Permitted" and "Blocked" are used without consideration of the kind of access in the example of domain allocation shown in FIG. 3, there may be provided a modified arrangement wherein a "Permitted" or "Blocked" state can be specified for each of read access and write access as exemplified in FIGS. 4 and 5. On occurrence of an illegal read access operation to a resource unit specified as being "Blocked" against read access, the access management circuit 20 returns an error response separately from read data or returns a fixed value, e.g., a value of "all bits zero" in any case. Alternatively, the access management circuit 20 returns an error response with a fixed value, e.g., a value of "all bits zero". Further, on occurrence of an illegal write access operation to a resource unit specified as being "Blocked" against write access, the access management circuit 20 nullifies write data while returning an error response or just nullifies write data without returning an error response. It will be obvious to those skilled in the art that the above setting of a "Permitted" or "Blocked" state for each of read access and write access is also applicable to domain allocation setting for the other resource units.

Figure 6:
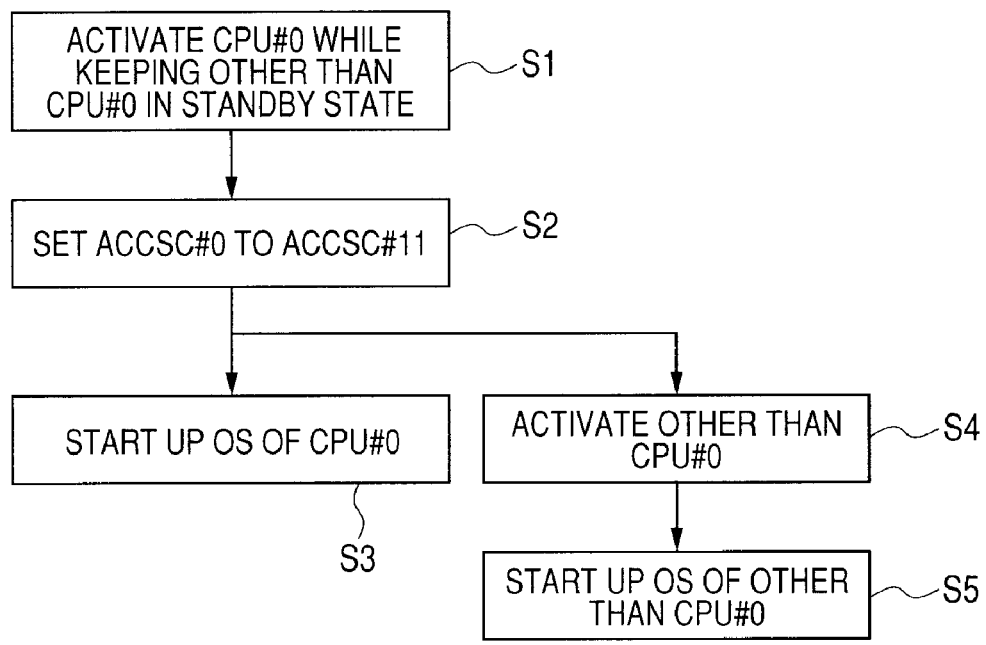
FIG. 6 is a flowchart showing an initial setting operation for a domain setup register.

FIG. 6 shows a flowchart of an initial setting operation for the domain setup register 65. When the microcomputer 1 is powered on, the internal hardware thereof is reset. Then, the central processing unit 10 (one of the central processing units) is activated while the central processing unit 11 (the other central processing unit) is kept in a standby state (S1). The central processing unit 10 activated carries out a program from a predetermined start-of-program address to perform initial setting of the domain setup register 65 for the access control circuits 20 to 31 (S2). Thereafter, the central processing unit 10 starts up an operating system thereof (S3). Simultaneously, the central processing unit 10 removes the standby state from the other central processing unit 11 for activation thereof (S4). Upon activated by the central processing unit 10, the central processing unit 11 starts up an operating system thereof (S5).

Execution of an orderly startup sequence such as mentioned above in the microcomputer 1 itself can prevent possible occurrence of an undesirably changed condition in domain separation processing of the central processing unit (CPU#0) 10 due to an adverse effect of the other central processing unit or operating system thereof.

Figure 7:
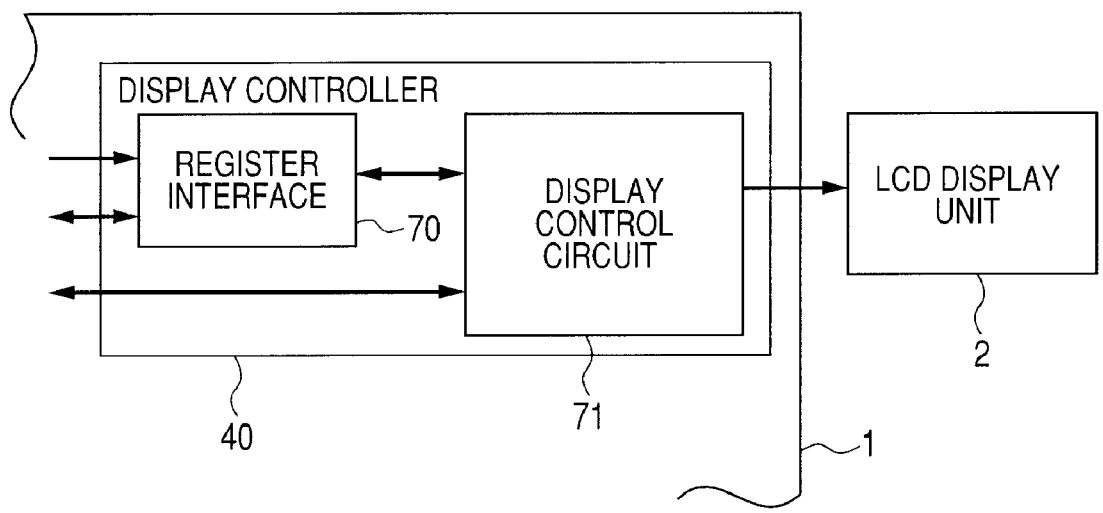
FIG. 7 is a block diagram showing the details of a display controller demonstrated as an illustrative embodiment of a resource unit to be used as a resource sharable by central processing units.

FIG. 7 shows the details of the display controller 40 demonstrated as an illustrative embodiment of a resource unit to be used as a resource sharable by the central processing units 10 and 11. In FIG. 7, for the sake of convenience, the display controller 40 is illustratively divided into a register interface 70 and a display control circuit 71. Thus, it will be easier for those skilled in the art to understand an arrangement made for access contention avoidance based on priority control of register sets for sharable resources. The register interface 70 represents an integrated configuration for interfacing between the registers of the display controller 40 and external circuits, and the display control circuit 71 represents a generically named configuration including circuits other than those of the register interface 70 in the display controller 40.

Figure 8:
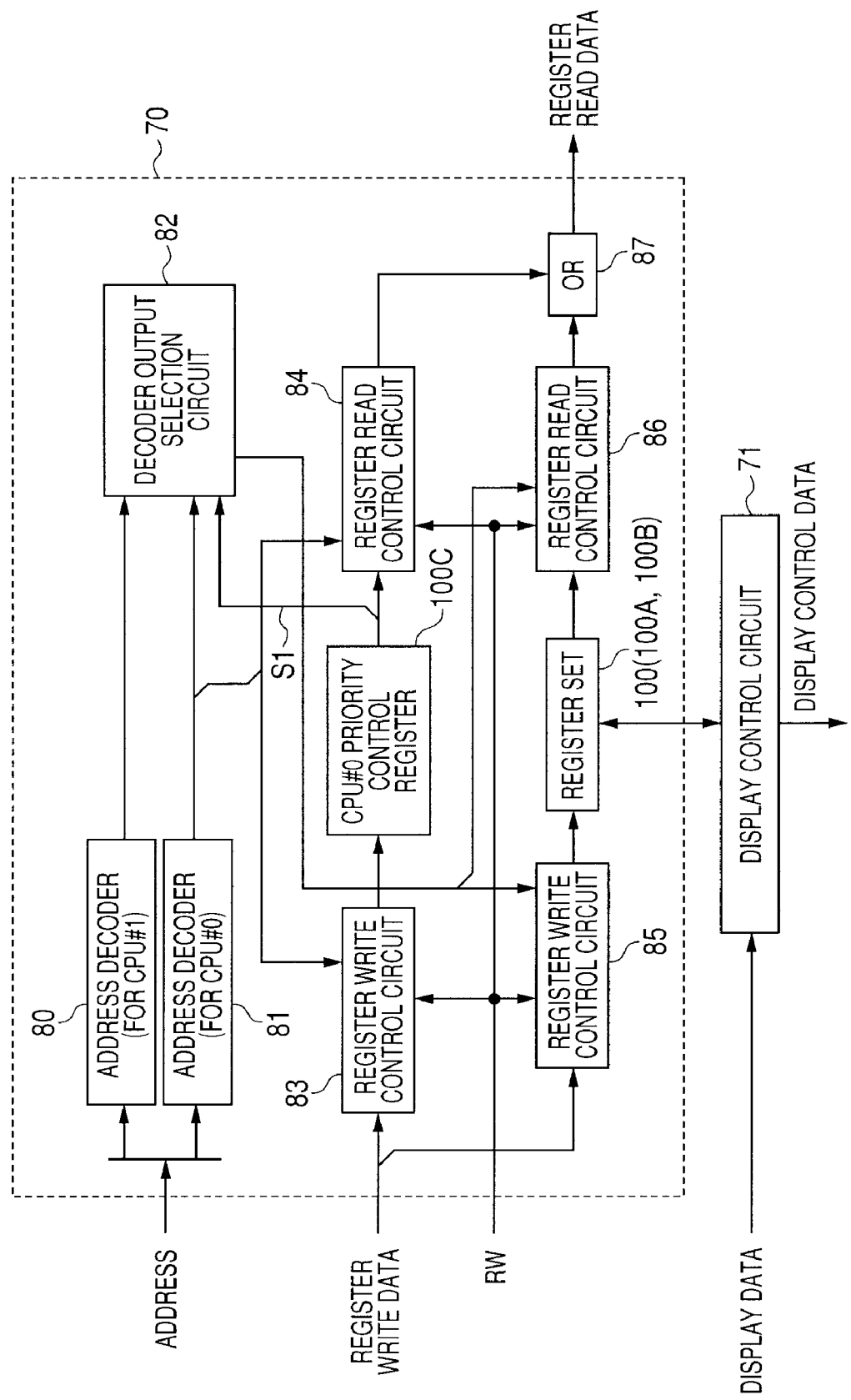
FIG. 8 is a block diagram showing an illustrative embodiment of a register interface.

FIG. 8 shows an illustrative embodiment of the register interface 70. In the display controller 40 which is a resource unit to be used as a resource sharable by the central processing units 10 and 11 under management of the access management circuits 20 to 31 as mentioned above, there is provided a priority control register 100C for which a write of priority control data is enabled by the central processing unit 10. The priority control register 100C is used for performing priority access permission control whereunder access from the central processing unit 10 identified by priority control data written in the priority control register (one of the central processing units 10 and 11) is given higher priority than access from the central processing unit 11 (the other one of the central processing units 10 and 11). For the priority access permission control stated above, there are provided access decoders 80 and 81, a decoder output selection circuit 82, and access control circuits for the register set 100, i.e., a register write control circuit 85 and a register read control circuit 86. The address decoder 81 has a decoding logic for mapping the register set 100 and the priority control register 100C to addresses F0800h to F0FFFh indicated in FIG. 3, and the address decoder 80 has a decoding logic for mapping the register set 100 to addresses F0000h to F07FFh indicated in FIG. 3. Upon receiving an input address signal, each of the address decoders 80 and 81 decodes the input address signal according to the decoding logic thereof to produce a register selection signal for the register set 100 and a register selection signal for the priority control register 100C. When priority control data S1 held in the priority control register 100C indicates "CPU#0", the decoder output selection circuit 82 selects a register selection signal corresponding to the register set 100B, i.e., a signal output from the address decoder 81. Alternatively, when the priority control data S1 held in the priority control register 100C indicates "CPU#1", the decoder output selection circuit 82 selects a register selection signal corresponding to the register set 100A, i.e., a signal output from the address decoder 80. Each of the register write control circuit 85 and the register read control circuit 86 receives a register selection signal output from the decoder output selection circuit 82. When a read/write signal RW indicates a write operation, the register write control circuit 85 writes register write data into the register set 100 according to the register selection signal concerned. Alternatively, when the read/write signal RW indicates a read operation, the register read control circuit 86 reads out register read data from the register set 100 according to the register selection signal concerned. In access control to be performed by the priority control register 100C, a register write control circuit 83 and a register read control circuit 84 are used. Each of the register write control circuit 83 and the register read control circuit 84 receives a selection signal for the priority control register 100C from the address decoder 81. When the read/write signal RW indicates a write operation, the register write control circuit 83 writes priority control data into the priority control register 100C according to the register selection signal concerned. Alternatively, when the read/write signal RW indicates a read operation, the register read control circuit 84 reads out priority control data from the priority control register 100C according to the register selection signal concerned. A logical OR circuit 87 is used to produce a logical OR signal with respect to output from the register read control circuit 84 and output from the register read control circuit 86.

Although not illustrated in particular, a configuration similar to that described above can be provided for the audio controller 41 also.

Thus, it is allowed to select a central processing unit acting as a requester for access to the specific resource units 40 and 41 according to register setting in the priority control register 100C independently of domain separation control specified in basic setting for the access management circuits 20 and 21 according to the domain setup register 65. The range of selection in the register setting is limited to the inclusion of the central processing units 10 and 11 that are privileged to have sharable resource access according to domain separation setting specified by the domain setup register 65. A change in the setting in the priority control register 100C will bring about no effect on the other conditions in domain separation setting. Further, for the central processing unit 10 only, it is allowed to change the setting in the priority control register 100C. Hence, the central processing units 10 and 11 can share the specific resource units 40 and 41 while ensuring overall reliability owing to domain separation in the microcomputer 1. In addition, for the central processing units 10 and 11 privileged to have sharable resource access, the physical circuitry of the register set 100 can be configured in a structure having commonality, thereby contributing to reduction in circuit size. It is to be noted that an access error will occur if it is attempted to make access to the register set 100 from a central processing unit having no priority access permission granted by the priority control register 100C even under the condition that access is not blocked in domain separation setting by the access management circuit. In the state mentioned above, no error will occur if the register set 100 is not accessed.

Figure 9:
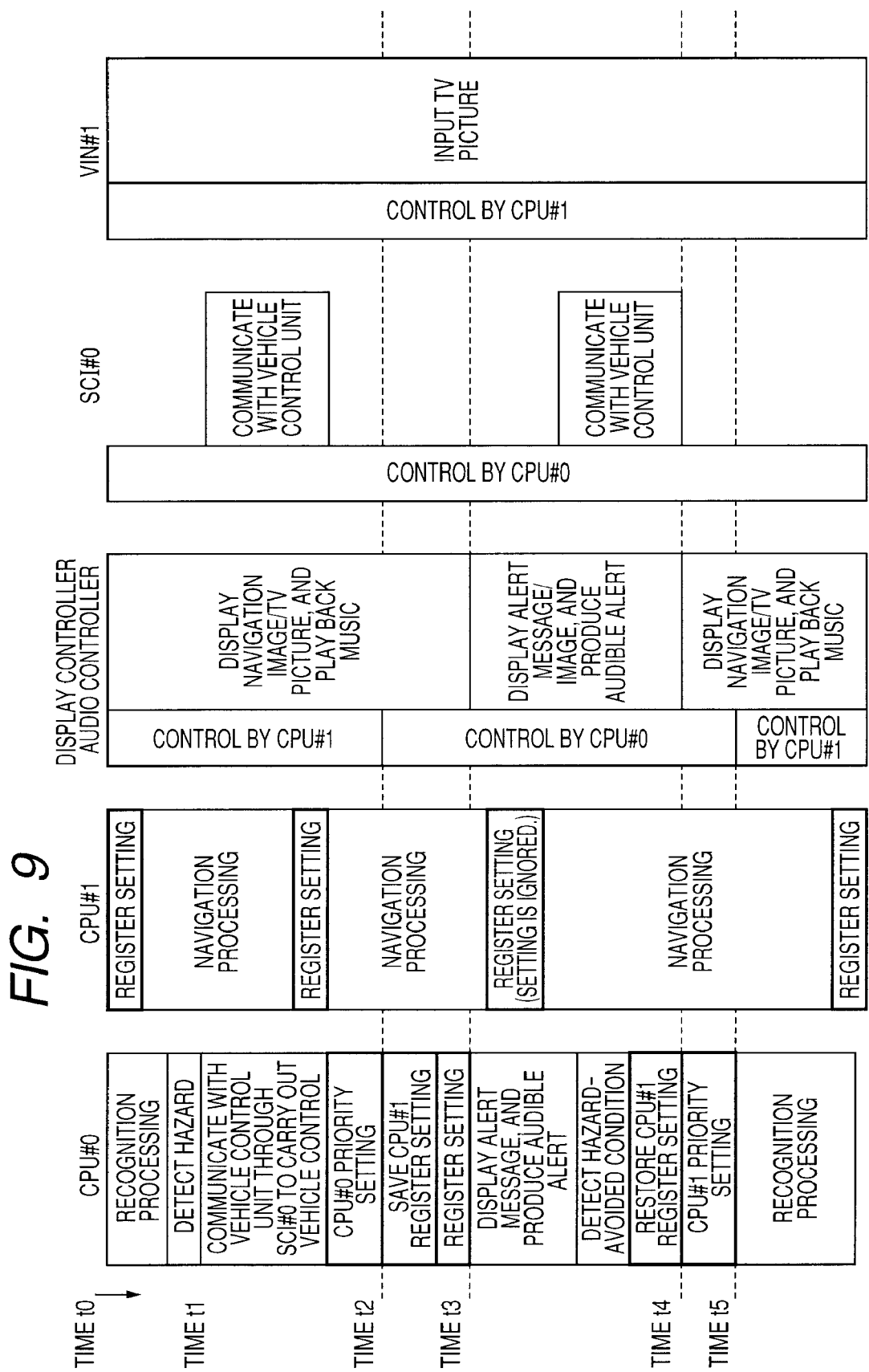
FIG. 9 is a flowchart showing operations for regulating a control system and an information system by changing priority control register setting in the microcomputer.

FIG. 9 shows a flowchart of operations for regulating the control system and the information system by changing priority control register setting in the microcomputer 1. In FIG. 9, there are indicated exemplary operations of the central processing unit (CPU#0) 10, the central processing unit (CPU#1) 11, the display controller 40, the audio controller 41, the serial communication interface controller (SCI#0) 42, and the video input circuit (VIN#1) 49. It is assumed here that the domain setup register 65 has initial setting thereof as shown in FIG. 3. At time t0, the priority control register 100C is set to contain priority control data for prioritizing the central processing unit (CPU#1) 11. The central processing unit (CPU#1) 11 performs register setting in the register sets 100A and 101A. According to the register setting, the central processing unit (CPU#1) 11 carries out control operations for navigation image display or TV picture display on the LCD display unit 2 and for music playback through the audio amplifier 3.

The image recognition processing circuit 51 performs image processing at all times for image recognition in the background of operations by the central processing unit (CPU#0) 10. Image data processed by the image recognition processing circuit 51 is input to the central processing unit 10 for execution of image recognition processing. In this situation, if a hazard is detected at time t1, the central processing unit (CPU#0) 10 communicates with the vehicle control unit 4 through the serial communication interface controller (SCI#1) 42 to perform brake assistance and engine control setting. Further, the central processing unit (CPU#0) 10 carries out a changeover to CPU#0 priority setting in the priority control register 100C for the display controller 40 and the audio controller 41 (time t2), and saves register data held in the register set (100) for the display controller 40 and the audio controller 41 into the SDRAM 8. Then, the central processing unit (CPU#0) 10 sets up new control data in the register set (100) for the display controller 40 and the audio controller 41 (time t3). Thus, under direction of the central processing unit (CPU#0) 10, alert message data and audible alert data are generated and fed to the display controller 40 and the audio controller 41. Upon receiving the alert message data and audible alert data, the display controller 40 and the audio controller 41 conduct operations of the LCD display unit 2 and the audio amplifier 2 according to the new control data specified in the register set (100). Thus, an alert message/alert image is presented on the LCD display unit 2, and an audible alert is produced through the audio amplifier 3. Meanwhile, although an attempt to access from the central processing unit (CPU#1) 11 to the register set (100) for the display controller 40 and the audio controller 41 is ignored, it is allowed for the central processing unit (CPU#1) 11 to carry out navigation processing continuously. Thereafter, when the central processing unit (CPU#0) 10 detects a hazard-avoided condition according to image data processed by the image recognition processing circuit 51, the central processing unit (CPU#0) 10 communicates with the vehicle control unit 4 through the serial communication interface controller (SCI#0) 42 to restore the brake assistance and engine control setting to normal operation setting. Further, the central processing unit (CPU#0) 10 restores the register data saved in the SDRAM 8 to the register set (100) for the display controller 40 and the audio controller 41 (time t4). Then, the central processing unit (CPU#0) 10 carries out a changeover to CPU#1 priority setting in the priority control register 100C for the display controller 40 and the audio controller 41 (time t5). Then, the central processing unit (CPU#1) 11 can resume navigation image display and music playback through navigation processing thereof. In parallel therewith, the central processing unit (CPU#0) 10 performs image recognition processing, thus being ready to detect another possible hazard.

In cases where a single physical register set is mapped to a plurality of different address area groups as exemplified above, though the central processing unit (CPU#1) 11 encounters an access error if priority is denied due to a change in the setting of the register set, a save/restore operation is performed for register set data at the time of a priority setting changeover in the priority control register 100. Thus, the previous operations including display control and sound playback can be resumed readily.

Figure 10:
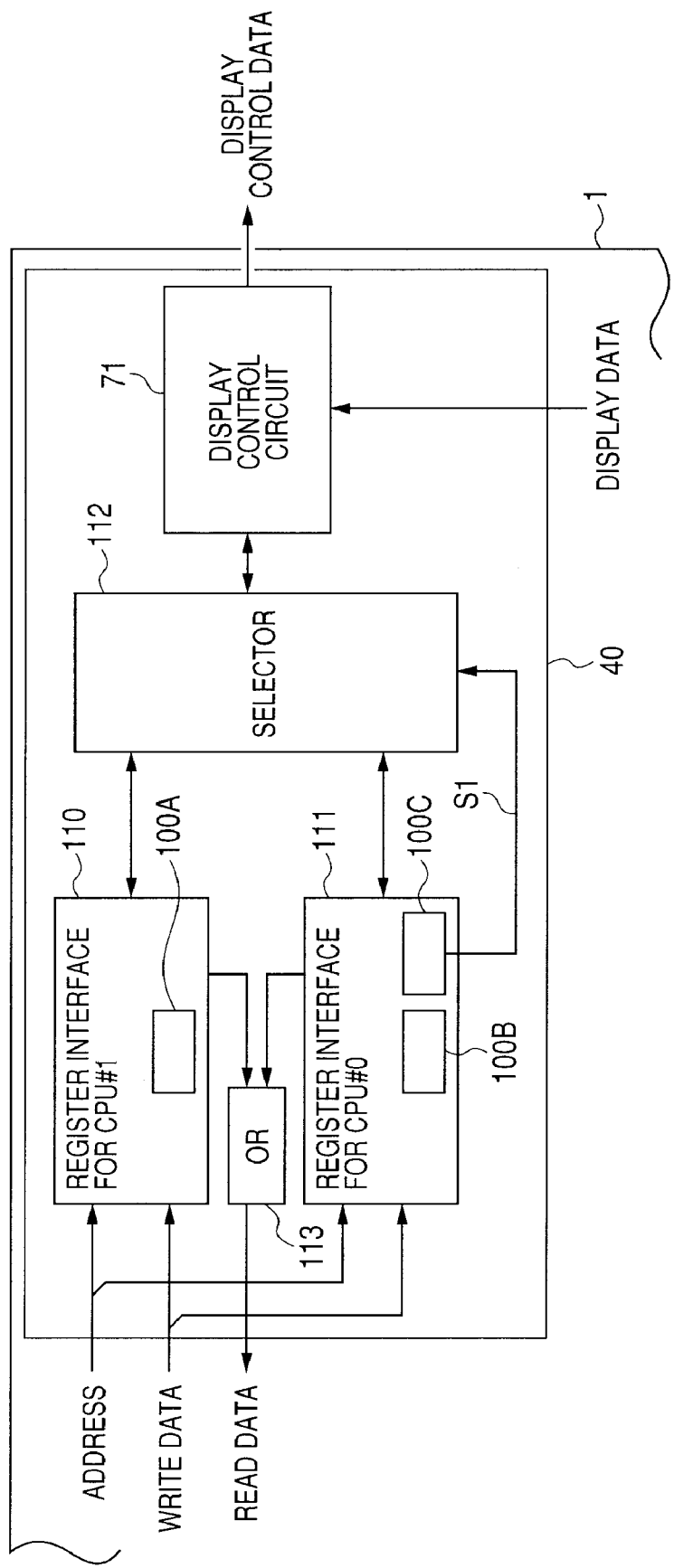
FIG. 10 is a block diagram showing another illustrative embodiment of a resource unit to be used as a resource sharable by the central processing units.

FIG. 10 shows another illustrative embodiment of a resource unit to be used as a resource sharable by the central processing units 10 and 11. As an example, there is provided a configuration of the display controller 40 in cases where physically different register sets are mapped to respective address area groups. For the central processing unit (CPU#1) 11 and the central processing unit (CPU#0) 10, a register interface (a first register interface circuit) 110 and a register interface (a second register interface circuit) 111 are provided respectively, and a selector 112 is disposed between a display control circuit 71 and the register interfaces 110 and 111. The register interface 110 includes a register set 100A, and the register interface 111 includes a register set 100B and a priority control register 100C.

Figure 11:
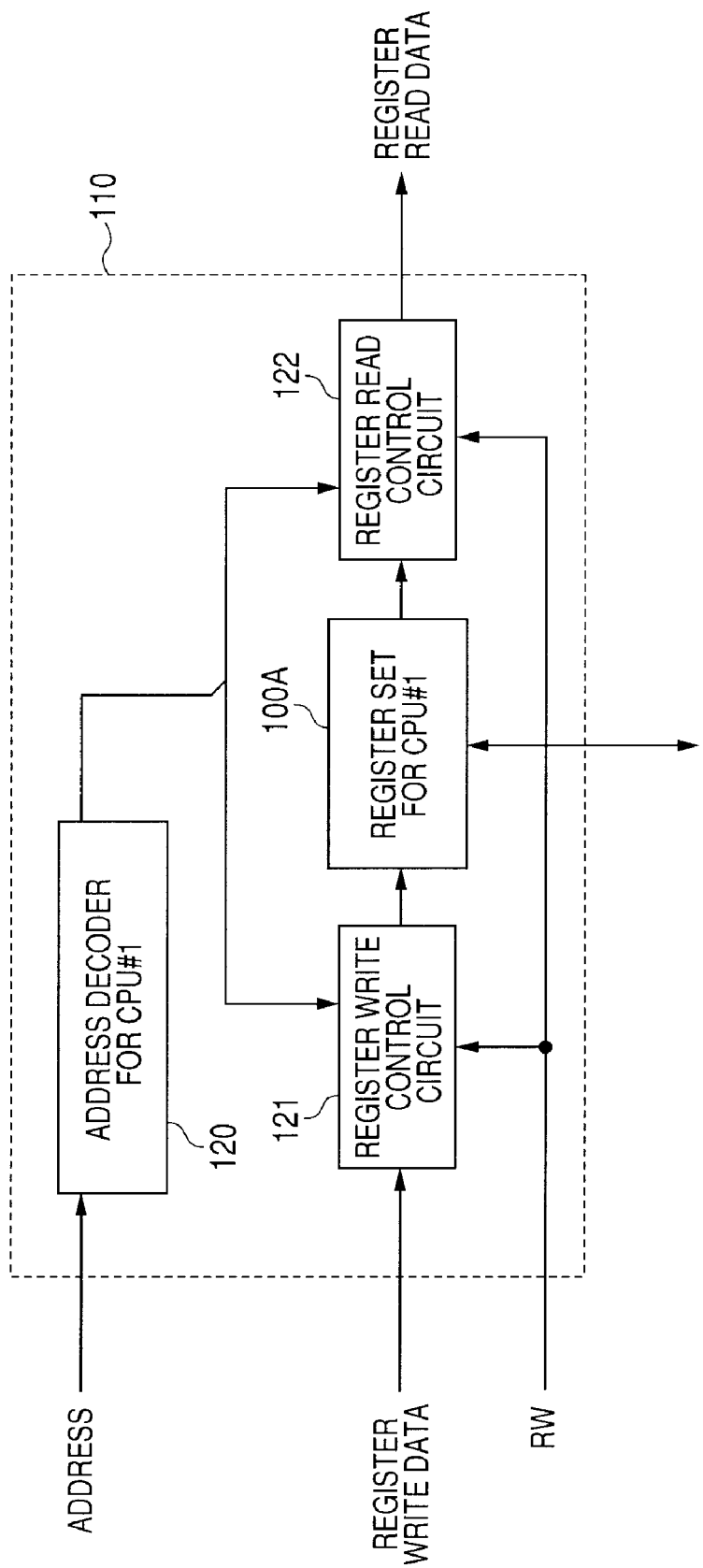
FIG. 11 is a block diagram showing an illustrative embodiment of a register interface for CPU#1.

FIG. 11 shows an illustrative embodiment of the register interface 110 provided for the central processing unit (CPU#1) 11. The register interface 110 further includes an address decoder 120, and access control circuits for the register set 100A, i.e., a register write control circuit 121 and a register read control circuit 122. The address decoder 120 has a decoding logic for mapping the register set 100A to addresses F0000h to F07FFh indicated in FIG. 3. Upon receiving an input address signal, the address decoder 120 decodes the input address signal according to the decoding logic thereof to produce a register selection signal for the register set 100A. Each of the register write control circuit 121 and the register read control circuit 122 receives the register selection signal output from the address coder 120. When a read/write signal RW indicates a write operation, the register write control circuit 121 writes register write data into the register set 100A according to the register selection signal concerned. Alternatively, when the read/write signal RW indicates a read operation, the register read control circuit 122 reads out register read data from the register set 100A according to the register selection signal concerned.

Figure 12:
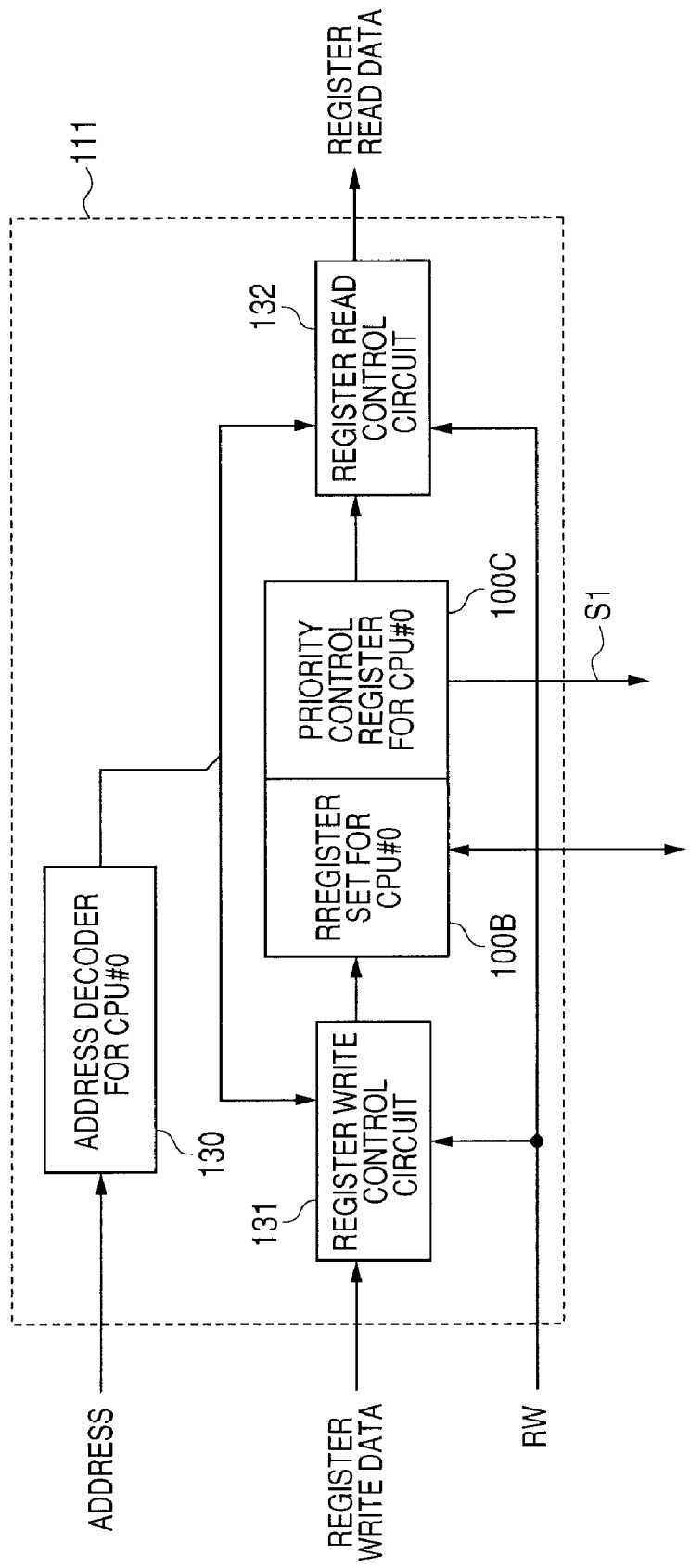
FIG. 12 is a block diagram showing an illustrative embodiment of a register interface for CPU#0.

FIG. 12 shows an illustrative embodiment of the register interface 111 provided for the central processing unit (CPU#0) 10. The register interface 111 further includes an address decoder 130, and access control circuits for the register set 100B and the priority control register 100C, i.e., a register write control circuit 131 and a register read control circuit 132. The address decoder 130 has a decoding logic for mapping the register set 100B and the priority control register 100C to addresses F0800h to F0FFFh indicated in FIG. 3. Upon receiving an input address signal, the address decoder 130 decodes the input address signal according to the decoding logic thereof to produce a register selection signal for the register set 100B and a register selection signal for the priority control register 100C. Each of the register write control circuit 131 and the register read control circuit 132 receives the register selection signal output from the address decoder 130. When a read/write signal RW indicates a write operation, the register write control circuit 131 writes register write data into the register set 100B or the priority control register 100C according to the register selection signal concerned. Alternatively, when the read/write signal RW indicates a read operation, the register read control circuit 132 reads out register read data from the register set 100B or the priority control register 100C according to the register selection signal concerned. Control data specified in the priority control register 100C is fed to the selector 112. When priority control data S1 in the priority control register 100C indicates CPU#0, the selector 112 selects a state for coupling the register set 100B of the register interface 111 to the display control circuit 71. Alternatively, when the priority control data S1 in the priority control register 100C indicates CPU#1, the selector 112 selects a state for coupling the register set 100A of the register interface 110 to the display control circuit 71. A logical OR circuit 113 shown in FIG. 10 is used to produce a logical OR signal with respect to output from the register read control circuit 122 and output from the register read control circuit 132.

Although not illustrated in particular, a configuration similar to that described above can be provided for the audio controller 41 also.

Thus, it is allowed to select a central processing unit acting as a requester for access to the specific resource units 40 and 41 according to register setting in the priority control register 100C independently of domain separation control specified in basic setting for the access management circuits 20 and 21 according to the domain setup register 65. The range of selection in the register setting is limited to the inclusion of the central processing units 10 and 11 that are privileged to have sharable resource access according to domain separation setting specified by the domain setup register 65. A change in the setting in the priority control register 100C will bring about no effect on the other conditions in domain separation setting. Further, for the central processing unit 10 only, it is allowed to change the setting in the priority control register 100C. Hence, the central processing units 10 and 11 can share the specific resource units 40 and 41 while ensuring overall reliability owing to domain separation in the microcomputer 1. Since the physical circuitry of the register set 100A and the physical circuitry of the register set 100B are provided for the central processing units 10 and 11 privileged to have sharable resource access, the circuit size is larger than that of the arrangement shown in FIG. 8. However, no error will occur even if it is attempted to make access to the register set from a central processing unit having no priority access permission granted by the priority control register 100C under the condition that access is not blocked in domain separation setting by the access management circuit.

Figure 13:
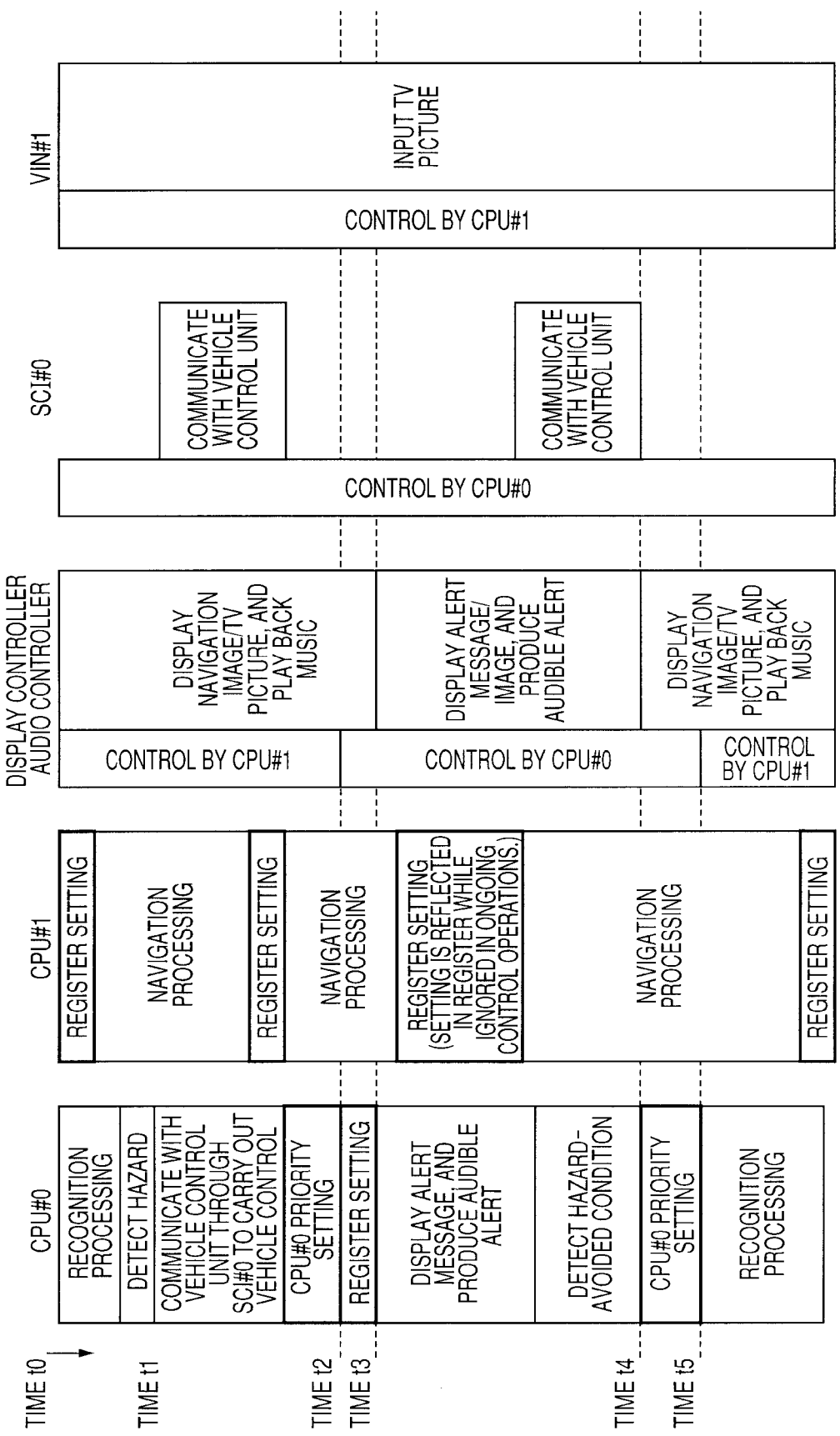
FIG. 13 is a flowchart showing operations for regulating a control system and an information system by changing priority control register setting in a microcomputer configuration illustrated in FIG. 10.

FIG. 13 shows a flowchart of operations for regulating the control system and the information system by changing priority control register setting in the microcomputer 1 configured as shown in FIG. 10. Basic operating conditions in FIG. 13 are similar to those in FIG. 9. Since physically different register sets 100A and 100B are provided for the central processing units 10 and 11 respectively for operations of the display controller 40 and the audio controller 41, it is not required to carry out a save operation after time t2 and a restore operation at time t4 differently from the case illustrated in FIG. 9. Hence, while the central processing unit (CPU#0) 10 is engaged with display control of an alert message or the like, it is allowed for the central processing unit (CPU#1) 11 to effectively perform data setting in the register set 100A for navigation processing with the display controller 40 and the audio controller 41. Note, however, that the data setting is not reflected in ongoing display presentation and music playback operations.

While the invention made by the present inventors has been described in detail with respect to specific embodiments thereof, it is to be understood that the present invention is not limited by any of the details of description and that various changes and modifications may be made in the present invention without departing from the spirit and scope thereof.

For example, the present invention is not limited to the above described exemplary embodiments using two central processing units, i.e., there may also be provided a modified arrangement wherein more than two central processing units are used. Further, each central processing unit may be a core unit including an accelerator, a working RAM, and the like as well as basic functions for instruction execution control. While the access management circuits in the illustrative embodiments described above are arranged distributively for respective resource units, the arrangement of the access management circuits is not particularly limited thereto, and logical components of the access management circuits may be disposed in an integrated fashion. The number of resource units, functions thereof, and bus structure may be modified as required for each application. The semiconductor data processing device is not limited to a single-chip semiconductor integrated circuit, and a multi-chip module device resin-shielded in one package may be used. The data processing system including a semiconductor data processing device according to the present invention is not limited to a car navigation system, and is applicable extensively to consumer electronic apparatuses such as television sets, image recording/playback equipment, telephone sets and printers, and industrial control apparatuses. In application to vehicles, the present invention is not limited to automobiles, and may be adopted for a variety of transportation facilities such as electric railcars and marine vessels.

What is claimed is:

1. A semiconductor data processing device comprising:
a plurality of central processing units;
an internal bus for coupling the central processing units;
a plurality of resource units sharable by the central processing units via the internal bus; and
a plurality of access management circuits for managing access from the central processing units to the resource units,
wherein each of the access management circuits performs permission/inhibition control for access from the central processing units to the resource units according to a setting state of a domain setup register, and
wherein, among the resource units, specific resource units selectively recognized by the access management circuits as sharable resources to be accessed from the central processing units include: a priority control register for which a write of priority control data is enabled by a predetermined one of the central processing units; and a plurality of control circuits for performing priority access permission control whereunder access from one of the central processing units that is identified by priority control data written in the priority control register is given higher priority than access from the other central processing units.

2. The semiconductor data processing device according to claim 1,
wherein initial setting of the priority control register is made by the predetermined central processing unit.

3. The semiconductor data processing device according to claim 2,
wherein each of the central processing units is arranged to use the resource units under management of each operating system inherent therein.

4. The semiconductor data processing device according to claim 3,
wherein the predetermined central processing unit is activated at power-on to perform initial setting of the domain setup register, and then the predetermined central processing unit starts up an operating system thereof and simultaneously activates the other central processing units, each of which then starts up an operating system thereof.

5. The semiconductor data processing device according to claim 1,
wherein each specific resource unit selectively recognized as a sharable resource comprises a register set used for processing execution thereof, and
wherein the control circuits include: a plurality of address decoders for mapping the register set to each of different address area groups for each central processing unit that is privileged to have sharable resource access by the access management circuit; a decoder output selection circuit for enabling an output signal of one of the address decoders corresponding to the central processing unit identified by priority control data through selection among decoded signals of the respective address decoders; and a plurality of register access control circuits for conducting access control for each register of the register set according to the output signal enabled by the decoder output selection circuit.

6. The semiconductor data processing device according to claim 5,
wherein, when priority control data of the priority control register is changed, the predetermined central processing unit saves information held by the register set into memory, and when the priority control data of the priority control register is restored under the condition that the information of the register set is saved in the memory, the predetermined central processing unit restores the information saved in the memory to the register set.

7. The semiconductor data processing device according to claim 1,
wherein the number of specific resource units selectively recognized as sharable resources is equal to the number of central processing units that are privileged to have sharable resource access by the access management circuit,
wherein a plurality of register sets are provided for processing operation of the resource units, and
wherein the control circuits include: a plurality of address decoders for mapping the register sets to different address area groups for each central processing unit that is privileged to have sharable resource access by the access management circuit; a plurality of register access control circuits for conducting access control for each register of the register sets according to a decoded signal from the address decoder; and a register selector circuit for coupling between a processing circuit and a register set identified by priority control data through selection among the register sets.

8. The semiconductor data processing device according to claim 7,
wherein, when priority control data of the priority control register is changed, the predetermined central processing unit saves information held by the register set into the memory, and when the priority control data of the priority control register is restored under the condition that the information of the register set is saved in the memory, the predetermined central processing unit restores the information saved in the memory to the register set.

9. The semiconductor data processing device according to claim 1, further comprising:
a plurality of direct memory access controllers, included in the resource units, for performing data transfer control in accordance with initial setting by one of the central processing units.

10. The semiconductor data processing device according to claim 1, further comprising:
a display controller and an audio controller used as specific resource units selectively recognized as resources sharable by the central processing units; and
an image recognition processing circuit and a plurality of external communication interface controllers as other resource units.

11. A data processing system comprising:
a semiconductor data processing device; and
a display unit to be controlled for display operation by the semiconductor device,
wherein the semiconductor data processing device comprises:
a plurality of central processing units;
an internal bus for coupling the central processing units;

a plurality of resource units sharable by the central processing units via the internal bus; and a plurality of access management circuits for managing access from the central processing units to the resource units, wherein each of the access management circuits performs permission/inhibition control for access from the central processing units to the resource units according to a setting state of a domain setup register, wherein, among the resource units, a display controller is provided as a specific resource unit that is selectively recognized by the access management circuit as a resource sharable by the central processing units, and wherein the display controller includes: a priority control register for which a write of priority control data is enabled by a predetermined one of the central processing units; and provided with a plurality of control circuits for performing priority access permission control whereunder access from one of the central processing units that is identified by priority control data written in the priority control register is given higher priority than access from the other central processing units.

12. The data processing system according to claim 11, further comprising:

a video camera for supplying a video signal to the semiconductor data processing device, wherein the semiconductor data processing device further comprises: a video signal input circuit for inputting the video signal; and an image recognition processing circuit for carrying out image processing operation for image recognition according to the video signal input through the video signal input circuit, and wherein the predetermined central processing unit performs image recognition according to data processed by the image recognition processing circuit, and instructs the display controller to present an alert indication on the display unit according to the result of image recognition.

13. The data processing system according to claim 12, further comprising:

a vehicle control unit for receiving output from the semiconductor data processing device, wherein the semiconductor data processing device further comprises an external communication interface controller for outputting control data to the vehicle control unit, wherein, under direction of the predetermined central processing unit, the display controller outputs alert indication data onto the display unit, and also the external communication interface controller outputs control data to the vehicle control unit as required in the event of alerting.

14. A data processing system comprising:

a semiconductor data processing device; and an audio amplifier for receiving an audio signal output from the semiconductor data processing device, wherein the semiconductor data processing device comprises:

a plurality of central processing units;

an internal bus for coupling the central processing units;

a plurality of resource units sharable by the central processing units via the internal bus; and a plurality of access management circuits for managing access from the central processing units to the resource units, wherein each of the access management circuits performs permission/inhibition control for access from the central processing units to the resource units according to a setting state of a domain setup register, wherein, among the resource units, an audio controller is provided for outputting the audio signal as a specific resource unit that is selectively recognized by the access management circuit as a resource sharable by the central processing units, and wherein the audio controller includes: a priority control register for which a write of priority control data is enabled by a predetermined one of the central processing units; and a plurality of control circuits for performing priority access permission control whereunder access from one of the central processing units that is identified by priority control data written in the priority control register is given higher priority than access from the other central processing units.

15. The data processing system according to claim 14, further comprising:

a video camera for supplying a video signal to the semiconductor data processing device, wherein the predetermined central processing unit performs image recognition according to data processed by the image recognition processing circuit, and instructs the audio controller to produce an audible alert from the audio amplifier according to the result of image recognition.

16. The data processing system according to claim 15, further comprising:

a vehicle control unit for receiving output from the semiconductor data processing device, wherein the semiconductor data processing device further comprises an external communication interface controller for outputting control data to the vehicle control unit, and wherein, under direction of the predetermined central processing unit, the audio controller outputs audible alert data to the audio amplifier, and also the external communication interface controller outputs control data to the vehicle control unit as required in the event of alerting.

* * * * *